Patented Feb. 4, 1930

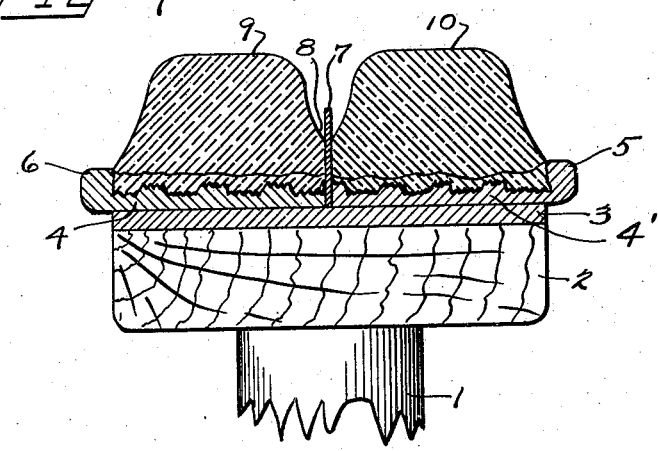
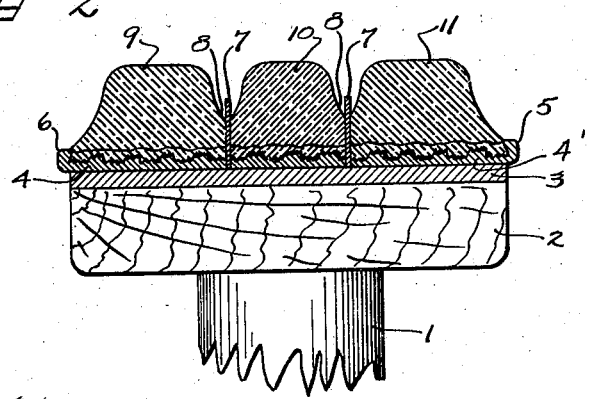
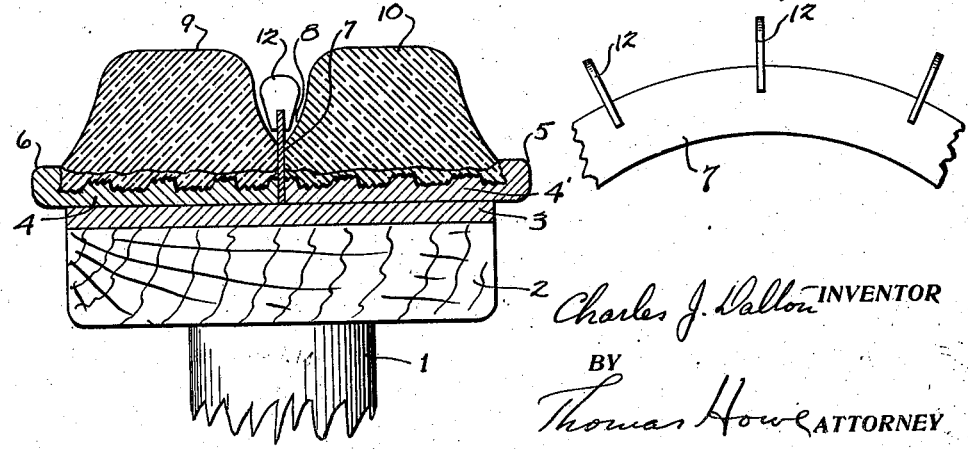

1,746,031

UNITED STATES PATENT OFFICE

CHARLES J. DALTON, OF NEW YORK, N. Y.

COOLING DEVICE FOR TRUCK TIRES

Application filed December 18, 1922, Serial No. 607,489. Renewed June 29, 1929.

This invention relates to means for preventing overheating of tires and particularly where a plurality of tires are employed on a truck wheel.

It has been found in the use of a plurality of tires on the wheel of a truck that where there is a rubber to rubber contact, rubbing of the contacting surfaces over each other as the wheel passes along the roadway, particularly under heavy loads causes considerable heat to be generated, sometimes to such a degree as to cause the rubber to melt. This is aggravated by the heavy weights that trucks often carry, and the rough roads over which they may travel. It has also been noticed that the interior of the tires will quickly rot in view of the intensity of the heat generated at intervals.

It is the object of this invention to eliminate the trouble heretofore occasioned by providing means for preventing or taking care of the heat generated by the rubbing together of rubber surfaces of tires.

A further object is to provide a device which will be unitary in its nature and inexpensive to manufacture.

Further objects will appear upon a study of the following specification and appended claims taken in conjunction with the drawings which illustrate the invention and in which drawings:—

Figure 1 is a cross section through the tires and felloe of a wheel provided with two solid rubber tires and which embodies the invention;

Figure 2 is a modified form showing a view similar to Figure 1 but with three tires instead of two;

Figure 3 is a further modification showing a cross section of a wheel provided with two tires, an annular ring disposed therebetween and fan or paddle blades attached to the ring; and Figure 4 is a side elevation of a fragment of the ring shown in Figure 3.

Referring to the drawings, spokes 1 of a wheel are attached to the usual felloe 2, upon which is mounted the felloe rim 3 in the usual manner, and the spokes are secured in a hub in any usual or suitable manner. The tires comprising the rubber treads 9 and 10 mounted upon the tire bands 4 and 4' having the beads or flanges 6 and 5, are mounted on the felloe rim 3. As shown in Fig. 1 two tires may be used. Disposed between the tires 9 and 10 is a flat metal ring 7 which is easily slidable over the rim 3 and extends entirely around the rim, and when in position is tightly held between the tires. A recess 8 is formed between the tires and it will be noted that the ring 7 extends into the recess 8 a short distance.

As the truck travels, there will a constant rubbing of the tires 9 and 10 upon the metal ring 7 causing it to become hot after a time although the heat thus generated is less than would be the case with a rubber to rubber contact. The ring 7 conducts this heat out into the atmosphere, thereby preventing the heat from rising to any great intensity.

Figure 2 shows a modification where the rings are used with three tires 9, 10 and 11.

In Figure 3, a fan 12 is shown as attached to the ring 7. A fan 12 is shown pear-shaped and is secured transversely the edge of the ring 7. Thus when the tire is revolving rapidly the fan will serve to set in motion cooling currents of air, thereby providing an additional cooling means. The fan 12 may serve the additional purpose of a traction paddle or blade when the tire sinks into mud, enabling the wheel to secure traction thereby.

While the invention has been illustrated in what are considered its best applications, it may have other embodiments without departing from its spirit and is not, therefore, limited to the structures shown in the drawings.

What I claim is:

The combination with a wheel, of a plurality of rubber tires secured to metallic rims fitted thereon, and a separate flat metal cooling and air circulating ring between said rims and tires, the rubber of said tires bearing against the opposite sides of the ring, said sides of the ring extending to a distance outside the contact with the rubber and having offset air circulating fan portions within the periphery of the tires whereby the sides are exposed to the atmosphere through which heat is radiated.

In testimony whereof I have signed this specification this 22nd day of September, 1922.

CHARLES J. DALTON.